(12) United States Patent
Euliss et al.

(10) Patent No.: US 9,951,232 B2
(45) Date of Patent: Apr. 24, 2018

(54) IR ABSORBING COATINGS COMPRISING FLUORINATED NANOPARTICLES

(71) Applicant: THE BOEING COMPANY, Huntingon Beach, CA (US)

(72) Inventors: Larken E. Euliss, Calabasas, CA (US); Brett Nosho, Santa Monica, CA (US); Nicole L. Abueg, Seattle, WA (US); G. Michael Granger, Redmond, WA (US); Peter D. Brewer, Westlake Village, CA (US); Maryam Behroozi, Woodland Hills, CA (US)

(73) Assignee: THE BOEING COMPANY, Chicago, IL (US)

( * ) Notice: Subject to any disclaimer, the term of this patent is extended or adjusted under 35 U.S.C. 154(b) by 331 days.

(21) Appl. No.: 14/691,800

(22) Filed: Apr. 21, 2015

(65) Prior Publication Data
US 2015/0225575 A1 Aug. 13, 2015

Related U.S. Application Data

(62) Division of application No. 13/621,522, filed on Sep. 17, 2012.

(51) Int. Cl.
*B64D 47/00* (2006.01)
*B64G 1/22* (2006.01)
(Continued)

(52) U.S. Cl.
CPC .................. *C09D 5/32* (2013.01); *C08K 5/57* (2013.01); *C09D 5/00* (2013.01); *B64D 47/00* (2013.01);
(Continued)

(58) Field of Classification Search
CPC .................................... C08K 3/30; C08K 9/04
See application file for complete search history.

(56) References Cited

U.S. PATENT DOCUMENTS 8,580,027 B1 * 11/2013 Campos ............... C08K 9/08
106/287.13
2003/0066998 A1 4/2003 Lee
(Continued)

FOREIGN PATENT DOCUMENTS

EP 2048116 4/2009
JP 2006513458 A 4/2006
(Continued)

OTHER PUBLICATIONS

Kovalenko, Maksym V., et al., "Supporting Information for Synthesis of Monodisperse SnTe nanocrystals: A New Example of Narrow Gap Semiconductor Quantum Dots," [retrieved May 18, 2017], available from the internet at https://s3-eu-west-1.amazonaws.com/pstorage-acs-6854636/.../ja074481z_si_001.pdf, pp. 1-6.
(Continued)

*Primary Examiner* — Ramsey E Zacharia
(74) *Attorney, Agent, or Firm* — Coats & Bennett, PLLC

(57) ABSTRACT

The present disclosure relates to solution processed nanomaterials, and methods for their manufacture, with activity in the infrared (IR) region for a variety of commercial and defense applications, including conformal large-area IR coatings, devices and pigments that necessitate an absorption band edge in the MWIR or LWIR.

10 Claims, 3 Drawing Sheets

(51) Int. Cl.
- *B82Y 15/00* (2011.01)
- *C08K 3/30* (2006.01)
- *C08K 5/57* (2006.01)
- *C08K 9/04* (2006.01)
- *C09D 5/32* (2006.01)
- *C09D 127/12* (2006.01)
- *C09D 5/00* (2006.01)

(52) U.S. Cl.
CPC .............. *B64G 1/226* (2013.01); *B82Y 15/00* (2013.01); *C08K 3/30* (2013.01); *C08K 9/04* (2013.01); *C09D 127/12* (2013.01); *Y10T 428/2438* (2015.01); *Y10T 428/24612* (2015.01); *Y10T 428/24628* (2015.01); *Y10T 428/254* (2015.01)

(56) References Cited

U.S. PATENT DOCUMENTS

| | | |
|---|---|---|
| 2004/0126072 A1 | 7/2004 | Lee et al. |
| 2005/0117868 A1 | 6/2005 | Chen et al. |
| 2007/0217755 A1 | 9/2007 | Chen et al. |
| 2009/0280586 A1 | 11/2009 | Coe-Sullivan |

FOREIGN PATENT DOCUMENTS

| | | | |
|---|---|---|---|
| JP | 2007130755 A | 5/2007 | |
| JP | 2012511827 A | 5/2012 | |
| WO | WO2000055656 | 9/2000 | |
| WO | 2005017951 A2 | 2/2005 | |
| WO | 2009051337 A1 | 4/2009 | |
| WO | WO2009051337 | 4/2009 | |
| WO | 2010067296 A1 | 6/2010 | |
| WO | 2010093671 A1 | 8/2010 | |
| WO | WO2010093671 | 8/2010 | |
| WO | WO-2012111009 A2 * | 8/2012 | .......... B01J 13/0039 |
| WO | WO2012134629 | 10/2012 | |

OTHER PUBLICATIONS

European Search Report dated Apr. 17, 2014 for European Application No. 13 180 453.6, 5 pages dated Apr. 17, 2014.

Kovalenko, Marksym V., et al., SnTe Nanocrystals: A New Example of Narrow-Gap Semiconductor Quantum Dots, J. Am. Chem. Soc., 2007, vol. 129, pp. 11354-11355 Jan. 1, 2007.

Shankar, S. Shiv, et al, Controlling the Optical Properties of Lemongrass Extract Synthesized Gold Nanotriangles and Potential Application in Infrared-Absorbing Optical Coatings, Chemistry of Materials; Jan. 1, 2014, pp. 566-572, India Jan. 14, 2005.

Office Action for Application No. JP2013-189925 dated Aug. 15, 2017.

* cited by examiner

IR ABSORBING COATINGS COMPRISING FLUORINATED NANOPARTICLES

CROSS-REFERENCE

This U.S. patent application is a Divisional Application of commonly owned and presently pending U.S. patent application Ser. No. 13/621,522, filed Sep. 17, 2012, having the same title.

TECHNOLOGICAL FIELD

The present disclosure relates to specialty coatings and methods for their application and manufacture. More specifically, the present disclosure relates to tunable, fluorinated IR absorption materials and processes for their incorporation into fluorinated coatings.

BACKGROUND

Materials able to absorb IR radiation in selected regions, including throughout the mid-wavelength infrared (MWIR) region and into the long-wavelength infrared (LWIR) region, are known, as are methods for manufacturing a nanomaterial that is tunable for absorbing IR radiation in selected regions. Quantum nanomaterials, such as quantum dots (QDs), quantum rods and nano-tetrapods have been developed that may be incorporated into paints or coatings that are sensitive to, and absorb incident IR radiation. Such quantum materials have bandgaps that may be tuned by altering the size and morphology of the quantum materials so as to correspondingly alter the region within the IR spectrum to which the nanomaterials are sensitive. However, the incorporation of such materials into coatings has not solved the problems associated with obtaining low cost IR tunable coatings on irregular or curved surfaces that provide substantially uniform IR absorption.

Many infrared device materials are fabricated with high-vacuum deposition systems that must be constantly maintained and used to remain in working order. Such known systems cannot accommodate or deposit materials onto very large objects and thus do not match the needs of many infrared device applications, in particular, economical depositions onto large areas.

BRIEF SUMMARY

Solution processed nanomaterials and devices offer the alternative of lower cost device manufacturing where equipment can be stored unused for long periods of time, transported easily to other locations, and then set up and used quickly to produce a batch of custom materials.

The present disclosure relates to solution processed nanomaterials with activity in the infrared (IR) region for a variety of industrial applications, including conformal large-area IR coatings, devices and pigments that necessitate an absorption band edge in the mid-wavelength infrared (MWIR) or long-wavelength (LWIR). Applications for MWIR and LWIR nanomaterials include nanomaterial-based IR pigments that can be encapsulated into sprayable resins for application. Development of nanomaterial processing techniques that are cost-effective, robust and that can be rapidly integrated will enable new conformal coatings that are environmentally robust.

In one variation, the present disclosure is directed to methods for making an infrared absorbing coating material comprising the steps of providing quantum nanoparticles, with the quantum nanoparticles comprising stabilizing hydrocarbon ligands on the surface of the nanoparticles. The hydrocarbon surface ligands are replaced with partially to fully fluorinated hydrocarbon ligands. A fluorinated resin is provided and the quantum nanoparticles are predictably embedded into the fluorinated resin to produce an infrared absorbing coating material. The quantum nanoparticles are preferably quantum dots having an average diameter of from about 2 nm to about 100 nm. Various alternatives presented in this disclosure can be applied to any variation of morphology. For example, quantum dots, tetrapods, nanorods, cubic structures (cubes or nanocubes) and combinations thereof, can take advantage of the technology presented herein.

According to one variation, the infrared absorbing coating material preferably absorbs mid-wavelength infrared bandwidth from about 3 μm to about 5 μm. In addition, according to one alternative the stabilizing ligands on the quantum nanoparticles are selected from the group including fluorinated metal chalcogenides, halides, etc. and combinations thereof.

According to an alternative, the present disclosure is directed to a method for making an infrared absorbing coating material comprising the steps of synthesizing SnTe quantum nanoparticles comprising surface ligands, interchanging the surface ligands into fluorinated ligands, providing a material comprising a fluorinated resin, and embedding the SnTe quantum nanoparticles into the fluorinated resin.

According to a still further alternative, the present disclosure is directed to a method for coating a surface with an infrared absorbing coating comprising the steps of providing an amount of infrared absorbing coating material, said material comprising a fluorinated resin comprising embedded nanoparticles, delivering the coating material to a surface, and allowing the coating material to dry onto the surface. According to one variation, the surface to be coated is an irregular surface, or compound contour, or curved surface.

According to one variation, the present disclosure is directed to an infrared-absorbing coating material comprising a fluorinated resin comprising quantum nanoparticles embedded into the fluorinated resin. In one preferred variation, the quantum nanoparticles comprise quantum dots, preferably comprising fluorinated surface ligands.

According to one variation, the quantum dot nanoparticles preferably have an average diameter of from about 2 nm to about 15 nm, and the infrared absorbing coating material absorbs mid-wavelength infrared bandwidth from about 3 μm to about 5 μm.

In one alternative, the present disclosure relates to a base material having an irregular surface coated with an infrared-absorbing coating material comprising a fluorinated resin comprising quantum nanoparticles embedded into the fluorinated resin. In one preferred variation, the quantum nanoparticles comprise quantum dots, preferably comprising fluorinated surface ligands. Still further, in one alternative, the base material having an irregular surface comprises at least one section of surface that comprises a curved configuration.

Still further, in one alternative the present disclosure relates to a large scale object comprising a base material coated with the infrared-absorbing coating material comprising a fluorinated resin comprising quantum nanoparticles embedded into the fluorinated resin. In one preferred variation, the quantum nanoparticles comprise quantum dots, preferably comprising fluorinated surface ligands. Still further, in one alternative, the base material having an irregular surface comprises at least one section of surface that comprises a curved configuration.

The methods and structures of the present disclosure find particular utility as external or internal insulating layers in vehicles, structures and objects exposed to high and low temperatures, including atmospheric and space vehicles and structures. Allowable temperature range is understood to be defined by allowable range for the fluorinated resin selected.

BRIEF DESCRIPTION OF THE DRAWING(S)

Having thus described variations of the disclosure in general terms, reference will now be made to the accompanying drawings, which are not necessarily drawn to scale, and wherein:

DETAILED DESCRIPTION

The present invention will be described more fully hereinafter with reference to the accompanying drawings, where preferred alternatives are shown. The disclosures may, however, be embodied in many different forms and should not be construed as limited to the examples set forth. Rather, these examples are provided so that this disclosure will convey the scope of the inventions to those skilled in the field. Like numbers refer to like elements throughout.

Figure 1:
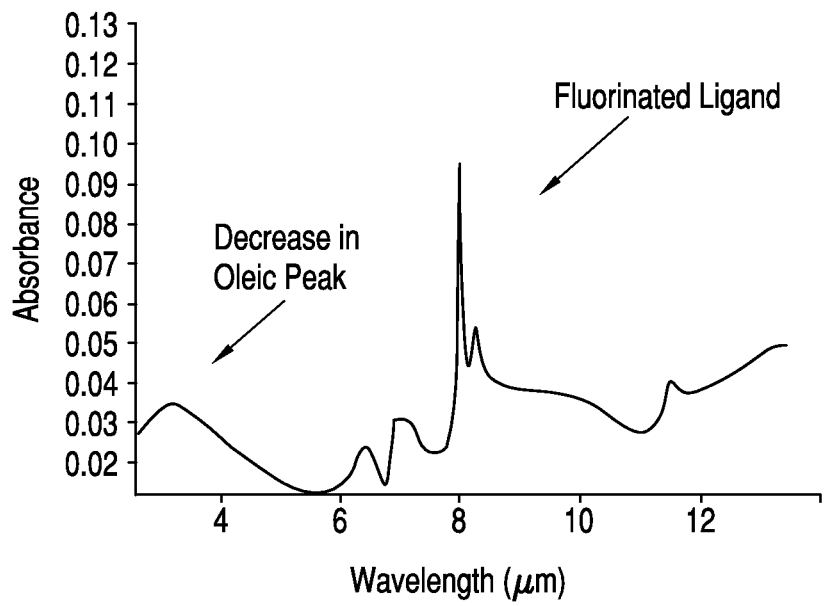
FIG. 1 is a graph showing an IR spectrum depicting successful ligand exchange of oleic acid on the surface of the MWIR quantum dots with a fluorinated ligand.

FIG. 1 is an absorbance spectrum of the MWIR-absorbing QDs after the exchange of the oleic acid ligand for the fluorinated ligand. The fluorinated ligands replace the oleic acid ligands as the stabilizing ligand. This is illustrated with a decrease of the oleic acid peak due to stretching of C—H bonds near 3.4 microns, and the appearance of the fluorinated ligand peaks.

Figure 2:
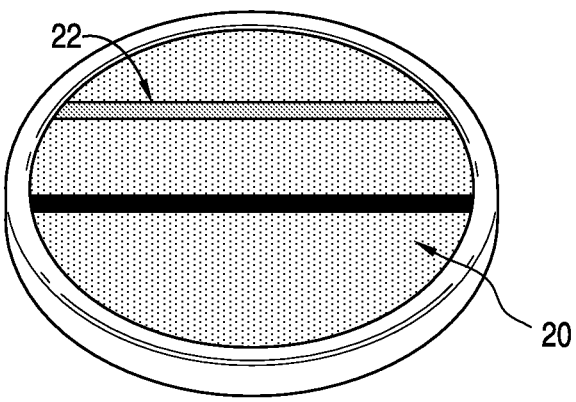
FIG. 2 shows an MWIR image of a coating with MWIR active nanomaterials loaded into a fluorinated resin versus unloaded fluorinated resin.

FIG. 2 represents an image taken with a MWIR active camera of an IR-transparent wafer coated with unloaded fluorinated resin overlaid with two additional band of MWIR QD-loaded fluorinated resin. The sample 20 is illuminated from the back with a blackbody source active in the IR region of interest. The MWIR QD loaded resin 22 appears dark, insinuating the absorbance effect from the QDs and not from the unloaded resin.

Figure 3:
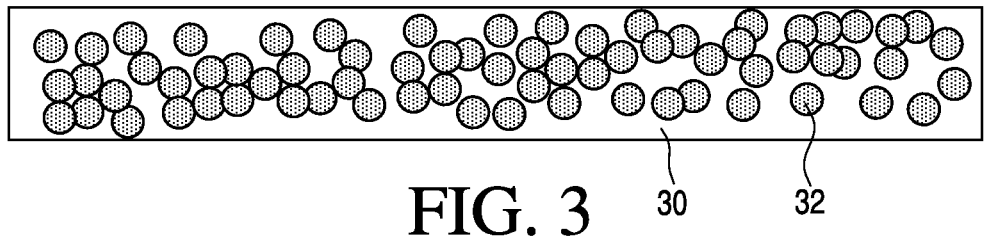
FIG. 3 is a schematic diagram showing the IR absorbing nanomaterial distributed within the fluorinated resin.

As shown schematically in FIG. 3, the IR-absorbing nanomaterial (quantum dot array) 32 is shown distributed within the fluorinated resin 30. Increase in loading and distribution will desirably and predictably increase the absorption properties. Tuning the size, morphology and material composition will also desirably and predictably tune the absorption properties.

Figure 4:
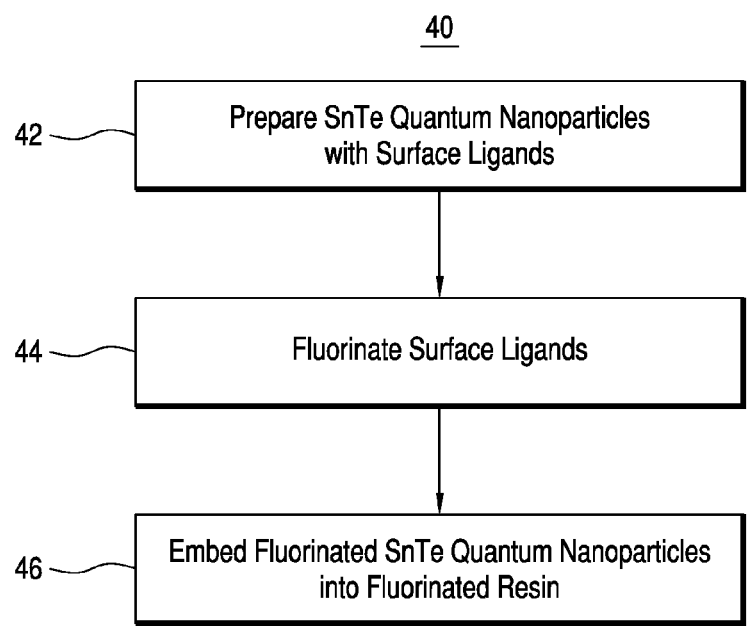
FIG. 4 is a flowchart outlining one variation for the manufacture of the fluorinated IR absorbing coating of the disclosure.

FIG. 4 is a flow chart showing one desired method for making the fluorinated resins described in the disclosure. According to process 40, SnTe quantum nanoparticles with surface ligands are first prepared 42. The surface ligands are then fluorinated 44, followed by embedding SnTe quantum nanoparticles into the fluorinated resin 46.

Figure 5:
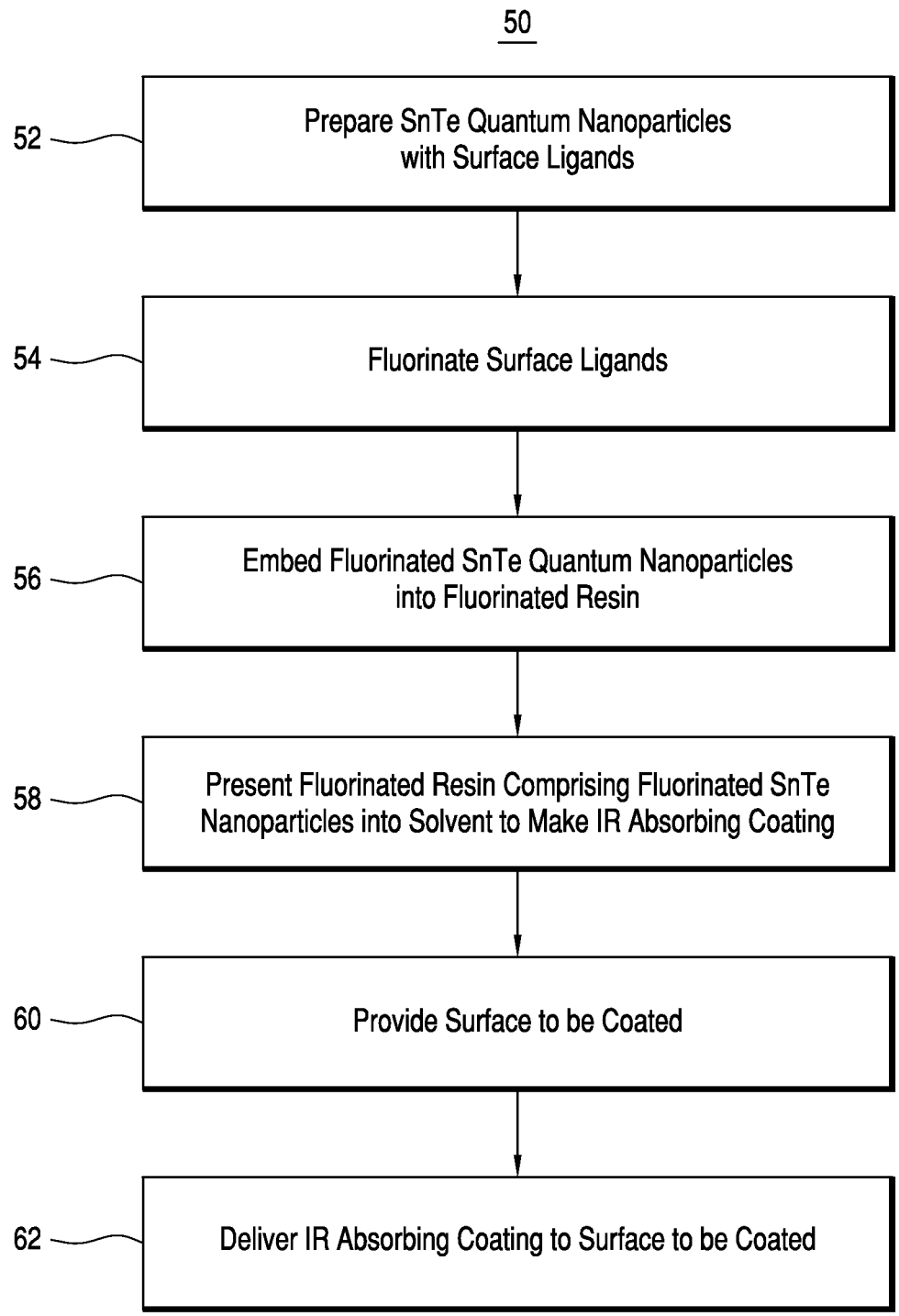
FIG. 5 is a flowchart outlining one variation for the manufacture of the application of the fluorinated IR absorbing coating of the disclosure.

FIG. 5 is a flow chart showing one desired method for delivering the IR absorbing coatings of the present disclosure to the surface being coated. According to process 50, SnTe quantum nanoparticles with surface ligands 52 are fluorinated 54, and the resulting fluorinated SnTe quantum nanoparticles are then embedded into a fluorinated resin 56. The fluorinated resin comprising the fluorinated SnTe quantum nanoparticles is then presented to a solvent to make the IR absorbing coating 58. A surface to be coated is then presented 60 and the IR absorbing coating is then delivered to the surface to be coated 62.

EXAMPLE 1

Synthesis of SnTe Quantum Dot nanoparticles

SnTe quantum dot nanoparticles were synthesized with stabilizing ligands on the surface of the nanoparticles. Bis [bis(trimethylsilyl)amino] tin (II) was combined with 1-octadecene (ODE, 90%), oleic acid (OA, 90%), trioctylphosphine (TOP, 90%) oleylamine (OLA, 70%) and tellurium powder (98.99%). The aforelisted chemicals were obtained from Aldrich (St. Louis, Mo.). ODE was vacuum dried at 140° C. for 2 hours and stored in an argon-filled glove box with bis[bis(trimethylsilyl)amino] tin (II), TOP and the tellurium (Te) powder. A 10 wt % solution of Te in TOP was prepared in a glove box by dissolving elemental Te in TOP at 200° C. for 6 hours. Monodispersed SnTe quantum dots were obtained using 90% purity TOP. The steps in the SnTe quantum dot synthesis were carried out in a glove box or on a vacuum/argon gas Schlenck line. Prior to synthesis, a tin precursor was formed in a glove box by dissolving 0.16 ml (0.4 mmol) of bis[bis(trimethylsilyl)amino] tin (II) in 6 ml of dry ODE. This solution was loaded into a 20 ml syringe with an 18 gauge needle and sealed in a 1 liter Nalgene bottle to prevent oxidation when the syringe was moved out of the glove box. Additionally, 1 ml of the Te in TOP solution (0.73 mmol) was loaded into a syringe. Next, a 3-neck 100 ml flask with a condenser column and septa on the side necks was attached to the Schlenk line. A solution (14 ml) comprising a mixture of OLA and ODE was placed into the flask and vacuum dried at 100° C. for one hour (20 or 70% OLA). The flask was then backfilled with argon and the syringe with 1 ml of Te in TOP was injected thereto. The reaction temperature was raised to 150° C. and the tin precursor syringe was removed from the Nalgene bottle and the contents were injected quickly into flask with the contents rapidly stirred. The temperature of the contents of the flask was allowed to drop to 30 to 40° C. after injection with the higher temperature maintained for 90 seconds. The heating mantle was removed and the reaction was allowed to cool to room temperature. Next, 3 ml of OA was injected to the cooled mixture, followed by adding 10 ml of 1:1 chloroform:acetone mixture, followed by an additional amount of acetone to cause precipitation of the quantum dot nanoparticles. The mixture was then centrifuged to separate the SnTe nanocrystals. The supernatant was poured off, and the nanocrystals were redissolved in chloroform or acetone. The precipitation, centrifugation and redissolution of SnTe were performed three times to increase nanocrystal purity.

EXAMPLE 2

Interchanging Surface Ligands into Fluorinated Ligands

SnTe quantum dot nanoparticles were prepared as stated in Example 1. An amount of 50 mg of the original SnTe dots (with oleic acid (OA) stabilizing ligands) were dissolved in 5 ml of dichloromethane with 200 mg of perfluorodecanoic acid and 200 mg of 1H, 1H, 2H, 2H perfluorodecane thiol. The mixture was purged with nitrogen and heated for 2 days at 40° C. in a closed 2-neck flask. The dichloromethane was removed and the free ligands were removed by washing out with acetone two times. The resulting quantum dot nanoparticles were redispersed in the following solvents: hexafluorobezene, pentafluorothiophenol, trifluorotoluene, and tetrafluorohexane. Verification of the successful ligand exchange was done by checking the ATR absorption. A reduction in the absorbance of the C—H peak and a new C—F absorption peak was observed. See FIG. 1.

EXAMPLE 3

Spraying or Dip Coating the Resin Mixture Comprising the Quantum Dot Nanoparticles with Fluorinated Ligands An amount of 50 mg of fluorinated quantum dot nanoparticles was dispersed in 5 ml of solvent (hexafluorobenzene) and 2 ml of fluorinated resin in a 1.5 g:0.5 g ratio. The mixture was cast in a Teflon™ mold and cured at room temperature. The quantum dot nanoparticle/fluorinated resin was allowed to cure for 48 hours. A 2.5% mixture of modified quantum dot nanoparticles in the fluorinated resin was obtained. The mixture was spray-coated, using an Iwata High Performance Plus HP-BC1 spraying gun. The spray gun used can be any spray gun used to apply paint or coatings over a large area (greater than about, for example, one inch). The fluorinated resin was then sprayed onto an aluminum coupon and cured at room temperature. The quantum dot nanoparticle/fluorinated resin coating was allowed to cure for 48 hours.

Although most examples here have discussed usefulness of the IR absorbing nanomaterial distributed within the fluorinated resin to be positioned on the exterior or interior of atmospheric and aerospace vehicles and other objects and structures designed for use in space or other upper-atmosphere environments, further uses abound where IR absorption would be useful, including, for example, manned or unmanned operation of objects and structures in an atmospheric or space environment. Contemplated objects include structures and vehicles, such as, for example, aircraft, satellites, rockets, missiles, etc., and therefore include manned and unmanned aircraft, spacecraft, terrestrial, non-terrestrial and even surface and sub-surface water-borne marine vehicles, objects, and structures.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. An infrared-absorbing coating material comprising:
a fluorinated resin comprising quantum nanoparticles, said quantum nanoparticles consisting of SnTe quantum nanoparticles, said SnTe quantum nanoparticles embedded into the fluorinated resin;
wherein the quantum nanoparticles comprise at least partially fluorinated surface ligands;
wherein the infrared-absorbing coating material absorbs infrared bandwidth from about 3 μm to about 15 μm; and
wherein the infrared-absorbing coating material is configured to provide a substantially conformal coating including uniform infrared absorption on an exterior of an atmospheric vehicle or a space vehicle.

2. A base material comprising an infrared-absorbing coating material, said base material comprising:
an external surface of an atmospheric vehicle or space vehicle, said infrared-absorbing coating material comprising:
fluorinated resin quantum nanoparticles, said quantum nanoparticles consisting of SnTe quantum nanoparticles;
wherein the SnTe quantum nanoparticles comprise at least partially fluorinated surfaces ligands, wherein the SnTe quantum nanoparticles are embedded into the fluorinated resin; and
wherein the infrared-absorbing coating material absorbs infrared bandwidth from about 3 μm to about 15 μm; and wherein the infrared-absorbing coating material is configured to provide a substantially conformal coating including uniform infrared absorption.

3. The base material of claim 2, wherein the quantum nanoparticles comprise particles selected from the group consisting of: quantum dots, tetrapods, nanorods, cubes, and combinations thereof.

4. The base material of claim 2, wherein the quantum nanoparticles comprise quantum dots.

5. The base material of claim 2, wherein the quantum dot nanoparticles have an average diameter of from about 2 nm to about 100 nm.

6. The base material of claim 2, wherein the infrared absorbing coating material absorbs mid-wavelength infrared bandwidth from about 3 μm to about 5 μm.

7. The base material of claim 2, wherein the infrared absorbing coating material absorbs long-wavelength infrared bandwidth from about 6 μm to about 15 μm.

8. The base material of claim 2, wherein the base material comprises at least one area selected from the group consisting of: a flat surface, a compound contour surface, a curved surface, and combinations thereof.

9. The infrared-absorbing coating material of claim 1, wherein the coating material is delivered to the exterior as a spray.

10. The base material of claim 2, wherein the coating material is delivered to a surface as a spray.

* * * * *